United States Patent [19]

Kajikawa et al.

[11] 4,431,100

[45] Feb. 14, 1984

[54] TORQUE FLUCTUATION DAMPER

[75] Inventors: Masauemon Kajikawa; Hiroyuki Kitajima; Tetsuo Tsuji, all of Komatsu, Japan

[73] Assignee: Kabushiki Kaisha Komatsu Seisakusho, Tokyo, Japan

[21] Appl. No.: 169,360

[22] Filed: Jul. 16, 1980

[51] Int. Cl.³ .............................................. F16D 3/66
[52] U.S. Cl. ................................................ 192/106.2
[58] Field of Search ............... 192/106.1, 106.2, 70.18; 464/68

[56] References Cited

U.S. PATENT DOCUMENTS

| | | | |
|---|---|---|---|
| 3,327,820 | 6/1967 | Maurice | 192/106.2 |
| 3,809,198 | 5/1974 | Mori | 192/106.2 |
| 3,948,373 | 4/1976 | Worner | 192/106.2 |
| 4,036,341 | 7/1977 | Beeskow et al. | 192/106.2 |

*Primary Examiner*—George H. Krizmanich

*Attorney, Agent, or Firm*—Armstrong, Nikaido, Marmelstein & Kubovcik

[57] ABSTRACT

A device to be connected between the engine and power train of a construction vehicle or the like for damping the fluctuations of the engine output torque. The damper comprises a housing having a drive plate, and a driven plate coaxially mounted in the housing for angular displacement within limits. Mounted between the housing and the driven plate are two friction drive mechanisms for frictionally transmitting the rotation of the housing to the driven plate. A plurality of torsional or compression springs are mounted to the driven plate so as to laterally project out of windows in the housing, so that when a slip occurs in the friction drive mechanisms, the housing acts endwise on the springs to cause their compression. Variable spacings are provided between the ends of the springs and the opposed edges of the housing bounding the windows.

1 Claim, 6 Drawing Figures

TORQUE FLUCTUATION DAMPER

BACKGROUND OF THE INVENTION

Our invention concerns a torque fluctuation damper to be connected between an internal combustion engine and a power train, as of industrial and construction vehicles, for controlling the output torque fluctuations of the engine and for protecting the power train from impulsive loading.

The transmission of engine output torque to the power train through a damper of the type under consideration has been common with industrial and construction vehicles. Upon application of the periodically varying torque of the engine to the power train through the damper, the angle of torsion exerted on the damper varies with the frequency of the torque fluctuations (as graphed in FIG. 1 of the attached drawings). At certain frequencies the so-called resonance occurs in which the damper is subjected to extremely great torsion.

The torsional angle at resonance is so great, indeed, that the damper may be impulsively twisted beyond its maximum allowable torsional angle. The result will be the breakage of the damper or of the power train connected thereto. For the avoidance of such trouble the damper should be so designed that resonance will not take place in the usual frequency range of torque fluctuations to which the damper is to be subjected.

SUMMARY OF THE INVENTION

Our invention aims at the provision of an improved torque fluctuation damper well calculated to prevent the occurrence of resonance in the usual range of torque fluctuation frequencies applied to the damper. In attaining this objective, moreover, our invention also succeeds in improving the torque transmitting ability of the damper.

In brief the damper of our invention comprises a housing having a drive plate or disc to be connected to and driven by an internal combustion engine, and a driven plate which is to be connected to a power train and which is coaxially mounted in the housing for angular displacement within limits. Means are provided between the housing and the driven plate for frictionally transmitting the engine torque to the power train. A plurality of torsional springs, preferably in the form of double coil compression springs, are mounted to the driven plate so as to be acted upon by the housing when a slip occurs in the frictionally transmitting means. Each torsional spring has its opposite ends disposed for engagement with opposed edges of the housing, there being variable spacings between the spring ends and the opposed housing edges.

Thus, as far as the flow of torque is concerned, the housing and the driven plate are resiliently coupled together via the torsional springs. These springs act to damp the fluctuating torque applied to the housing and to transmit the torque to the driven plate. By providing the variable spacings between the ends of the springs and the opposed edges of the housing as above, the resonance frequency can be made less than the normal frequency range of torque fluctuations to which the damper is to be subjected, and the maximum torque to be transmitted by the damper can also be increased.

The above and other features and advantages of our invention will become more apparent, and the invention itself will best be understood, from the following detailed description which is to be read in connection with the attached drawings.

DETAILED DESCRIPTION

Figure 1:
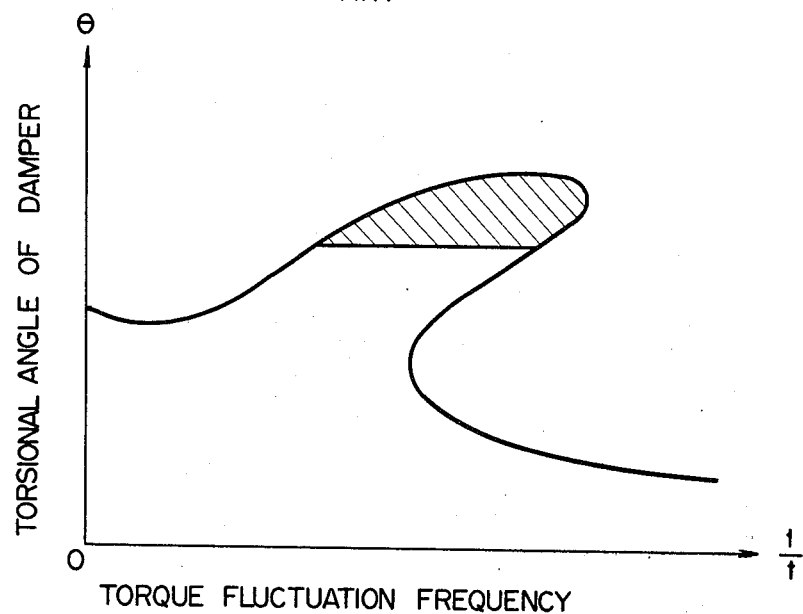
FIG. 1 is a graph plotting the curve of the torsional angle against the frequency of torque fluctuations in the prior art damper.

Prior to the detailed disclosure of our invention the problems in the prior art will be described in some more detail in connection with the drawings illustrating the problems, the better to make clear the features and advantages of our invention. As has been mentioned, the torsional angle in the prior art damper varies with the frequency of engine output torque fluctuations as in the graph of FIG. 1. Resonance occurs in the shaded area in the graph, resulting in the exertion of excessive torsion on the damper and, possibly, in the disruption of the power train connected to the damper or of the damper itself.

Figure 2:
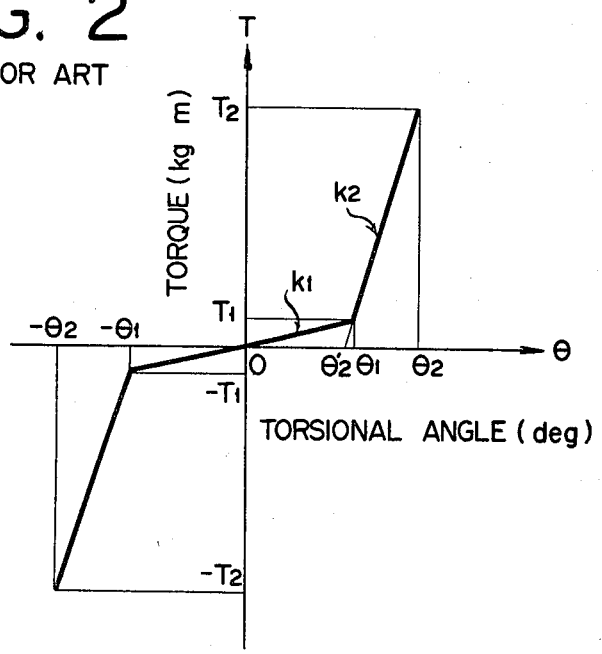
FIG. 2 is a graphic representation of the torsional spring characteristic of the prior art damper.

FIG. 2 graphically represents the torsional spring characteristic of the prior art damper. In the graph, $\theta 1$, $\theta 2$ and $\theta 2'$ are greater than zero; T1 and T2 are greater than zero; and k1 and k2 are the spring constants (kg-m/deg) and greater than zero. The resonance frequency $1/t$ of the prior art damper having this torsional spring characteristic can be given by $$t = 2\pi \sqrt{\frac{1}{k1\, q} \cdot \frac{\pi}{180}} \quad \text{(sec/cycle)} \ (0 < \theta \leq \theta 1)$$

$$t = 4\sqrt{\frac{\pi}{180 q}} \left\{ \sqrt{\frac{1}{k2}} \cos^{-1}\frac{\theta 1 - \theta 2'}{\theta - \theta 2'} + \sqrt{\frac{1}{k1}} \tan^{-1}\frac{\theta 1}{\sqrt{\frac{k2}{k1}(\theta - \theta 1)(\theta + \theta 1 - 2\theta 2')}} \right\}$$

$$\text{(sec/cycle)} \ (\theta 1 < \theta \leq \theta 2)$$

wherein $$q = 1/I1 + 1/I2$$

wherein I1 is the equivalent input moment of inertia, and I2 is the equivalent output moment of inertia, both in kg m s².

As will be seen from the above equations, it is difficult in the prior art damper to make the torque T2 sufficiently high and, at the same time, to make the resonance frequency $1/t$ sufficiently low. Resonance has therefore been very likely to occur in the normal frequency range of engine output torque fluctuations applied to the damper.

Figure 3:
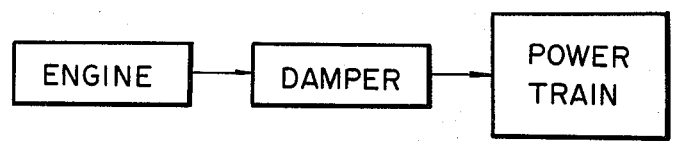
FIG. 3 is a block diagram explanatory of the mode of use of the damper in accordance with our invention.
Figure 4:
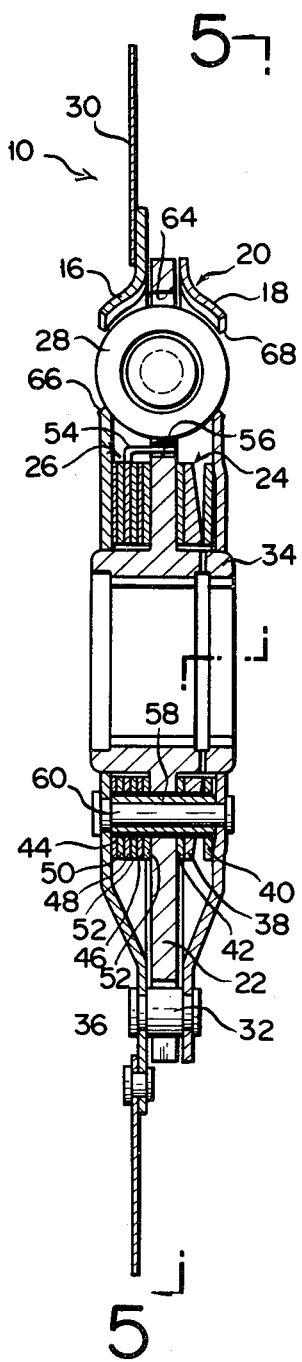
FIG. 4 is an axial sectional view of a preferred form of the damper in accordance with our invention.
Figure 5:
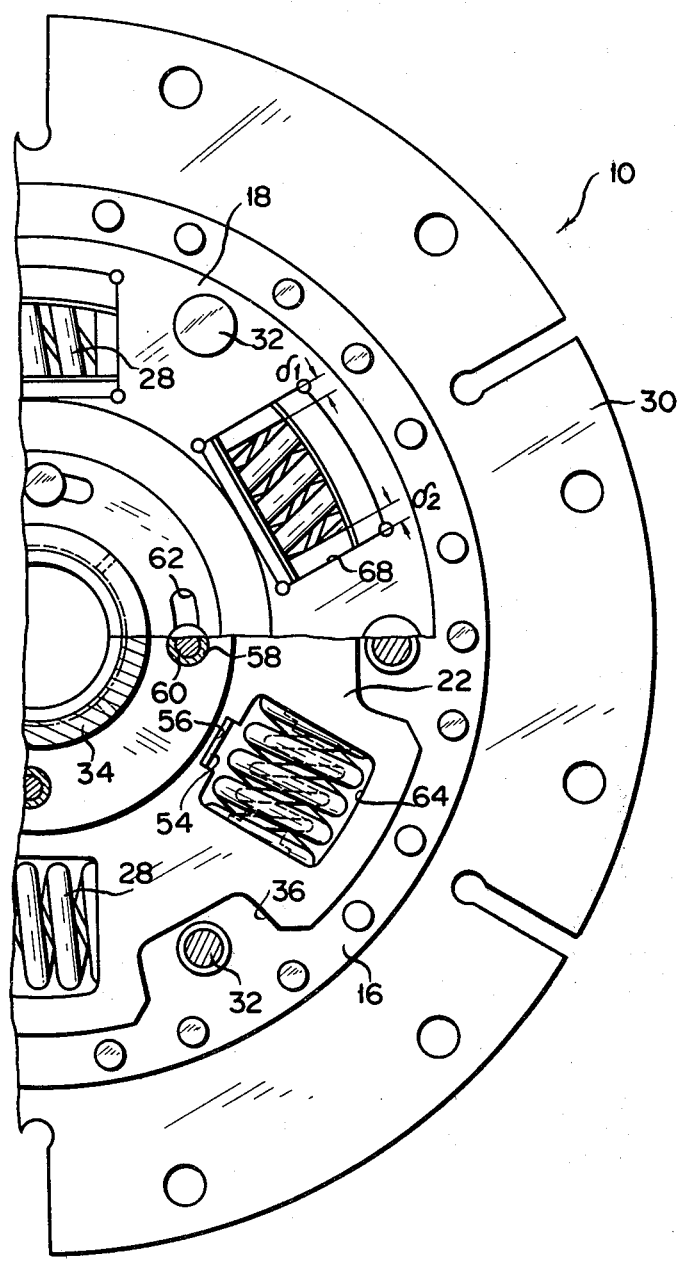
FIG. 5 is a partial, half elevational and half sectional view of the damper, with the section being taken along the line 5-5 of FIG. 4.

We will now describe the torque fluctuation damper of our invention in terms of its preferred form and as adapted for use on industrial and construction vehicles. As will be noted from FIG. 3, the damper 10 is to be interposed between the internal combustion engine 12 and power train 14 of a vehicle. With reference now directed to FIGS. 4 and 5 the damper 10 broadly comprises:

1. A drive plate 16 to to be connected to and driven by the vehicle engine 12.

2. A retaining plate 18 rigidly and coaxially connected to the drive plate 16 for simultaneous rotation therewith and forming a damper housing 20 in combination therewith.

3. A driven plate 22 coaxially mounted in the damper housing 20, or between the drive 16 and retaining 18 plates, for angular displacement relative to same within limits and adapted for connection to the vehicle power train 14.

4. A first friction drive mechanism 24 lying between the retaining 18 and driven 22 plates for frictionally transmitting the rotation of the retaining plate, and therefore of the drive plate 16, to the driven plate.

5. A second friction drive mechanism 26 lying between the drive 16 and driven 22 plates for frictionally transmitting the rotation of the drive plate to the driven plate.

6. A plurality of torsional or compression springs 28 acting between damper housing 20 and driven plate 22 and yielding when a slip occurs therebetween.

The drive plate 16 is shown to have a flange 30 riveted thereto for connection to the flywheel of the engine 12 as by bolting. It will be seen from FIGS. 4 and 5 that this drive plate, as well as all other "plates" of the damper 10, is more or less disc-like in shape. The retaining plate 18 is coupled to the drive plate 16 by a series of rivets 32 in annular arrangement. The drive 16 and retaining 18 plates serve in combination as the damper housing 20 enclosing the various other parts of the damper set forth in further detail hereinbelow.

The driven plate 22 has a hub 34 formed centrally thereon for splined connection to the vehicle power train 14. A series of peripheral recesses 36 are formed in the driven plate 22 at constant circumferential spacings to permit the rivets 32 to pass therethrough. The dimension of each recess 36 as measured in the direction of rotation of the driven plate 22 is greater than the diameter of each rivet 32. Thus the driven plate 22 is angularly displaceable relative to the damper housing 20 within the limits determined by the noted dimension of each driven plate recess 36 in relation to the diameter of each rivet 32.

The first friction drive mechanism 24 comprises a first friction plate 38 and a disc spring 40, both coaxially mounted on the driven plate hub 34. The first friction plate 38 has a lining 42 urged against the driven plate 22 under the bias of the disc spring 40. The spring-loaded friction plate 38 acts to frictionally transmit the rotation of the retaining plate 18 to the driven plate 22.

The second friction drive mechanism 26 comprises second 44 and third 46 friction plates and an intermediate plate 48 all coaxially mounted on the driven plate hub 34. Lying between drive plate 16 and intermediate plate 48, the second friction plate 44 has a lining 50 in frictional contact with the intermediate plate. The third friction plate 46 has a pair of linings 52 on its opposite surfaces which are held in frictional contact with the intermediate plate 48 and the driven plate 22, respectively.

Projecting radially outwardly from the intermediate plate 48 are a plurality of pawls 54 which are bent right-angularly. The extremities of these pawls 54 are closely engaged in openings 56 formed in the driven plate 22, so that the intermediate plate 48 rotates with the driven plate. Thus the second 44 and third 46 friction plates act to frictionally transmit the rotation of the drive plate 16 to the driven plate 22, both directly and through the intermediate plate 48.

At 58 are shown a plurality of collars disposed at constant angular spacings and extending across the driven plate 22, three friction plates 38, 44 and 46, disc spring 40, and intermediate plate 48. A double-headed pin 60 closely extends through each collar 58, and its opposite headed ends project out of arcuate slots 62 in the drive 16 and retaining 18 plates for joining these plates with a desired degree of tightness. When a slip occurs in the first 24 and second 26 friction drive mechanisms, the housing 20 and the driven plate 22 together with the intermediate plate 48 are to undergo relative angular displacement within the limits explained previously. Thus, although not specifically illustrated, it is understood that the double-headed pins 60 as well as the collars 58 extend through suitable openings in the noted members designed to permit the desired relative angular displacement of such members.

Each in the form of a double coil compression spring, the torsional springs 28 are mounted in respective rectangular openings 64 formed in the driven plate 22 at constant angular spacings. A pair of opposed windows 66 and 68 are formed in the drive 16 and retaining 18 plates on the opposite sides of each opening 64 in the driven plate 22. The opposite sides of each torsional spring 28 project outwardly through one of the pairs of opposed windows 66 and 68, so that the opposed edges of the drive 16 and retaining 18 plates bounding the windows 66 and 68 are movable into and out of engagement with the ends of the torsional springs.

In accordance with a feature of our invention the dimension of each window 66 and of each window 68 in the direction of rotation of the damper housing 20 is greater than the axial dimension of each torsional spring 28. FIG. 5 shows that for convenience of representation, equal spacings $\delta 1$ and $\delta 2$ exist between the ends of each torsional spring 28 and the opposed edges of the corresponding ones of the windows 66 and 68 in the housing 20. Such spacings are variable in the actual operation of the damper 10, however, in which either end of each torsional spring 28 will be usually in engagement with the opposed edges of the housing 20.

Figure 6:
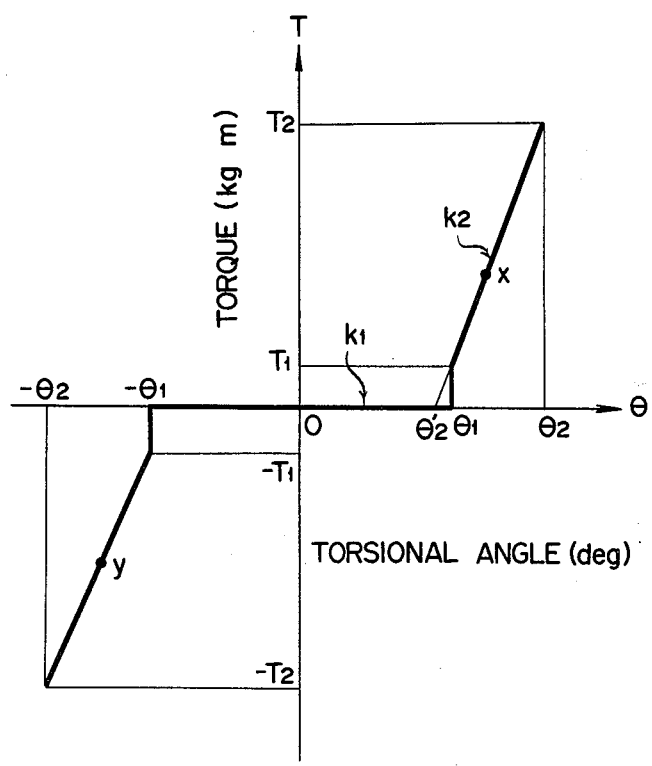
FIG. 6 is a graphic representation of the torsional spring characteristic of the damper of FIGS. 4 and 5.

FIG. 6 graphically represents the torsional spring characteristic of the damper 10 in accordance with our invention. In the graph, $\theta 1$, $\theta 2$ and $\theta 2'$ are greater than zero; T1 is equal to or greater than zero; T2 is greater than zero; k1 is the spring constant (kg-m/deg) and is equal to zero; and k2 is the spring constant (kg-m/deg) and greater than zero. The resonance frequency $1/t$ of this damper 10 is given by $$t = 2\pi \sqrt{\frac{\pi}{180q}} \sqrt{\frac{1}{k2}} \left(1 + \frac{2}{\pi} \frac{\theta 1}{\theta - \theta 1}\right)$$

wherein q is as defined above.

It is thus possible to make the resonance frequency 1/t sufficiently low while making the torque T2 sufficiently high. The damper 10 can therefore be designed so that the resonance frequency will lie less than the normal frequency range of expected torque fluctuations. The torque transmitting ability of the damper can also be increased as desired.

The operational description of the damper 10 follows. Let it be assumed that the damper 10 rotates in a clockwise direction, as viewed in FIG. 5, to transmit the rotation of the vehicle engine 12 to the power train 14. When a slip occurs in the first 24 and second 26 friction drive mechanisms, the spacing δ1 between one end of each torsional spring 28 and the opposed ends of the windows 66 and 68 will first become zero. This relative angular displacement between housing 20 and driven plate 22 explains the torsional angles 0 to θ1 in the torsional spring characteristic of FIG. 6.

With the continued rotation of the housing 20 in the clockwise direction, the torsional springs 28 may undergo compression, to an extent somewhere (x) between the torsional angles θ1 abd θ2 in FIG. 4. The damper 10 will then transmit the engine torque to the power train 14 through the compressed springs 28.

When the speed of the driven plate 22 becomes higher than that of the housing 20, the torsional springs 28 will first be relieved of compression, and then the spacings δ2 between the other ends of the torsional springs 28 and the opposed edges of the windows 66 and 68 will become zero. These spacings δ2 correspond to the torsional angles 0 to −θ1 in the graph of FIG. 4. Thereafter the torsional springs 28 will become compressed again, to an extent somewhere (y) between the torsional angles −θ1 and −θ2 in FIG. 4, with the consequent exertion of countertorque on the driven plate 22.

Thus the housing 20, with its drive plate 16, and the driven plate 22 are resiliently coupled together through the torsional springs 28. These springs act to control the fluctuating torque applied to the drive plate 16, transmitting the controlled torque to the driven plate 22.

We claim:

1. A damper to be interposed between an internal combustion engine and a power train for controlling the torque fluctuations of the engine, comprising:
    (a) a housing having a drive plate to be connected to and driven by the engine;
    (b) a driven plate coaxially mounted in the housing for angular displacement within limits, the driven plate being connected to the power train for imparting the torque thereto;
    (c) means between the housing and the driven plate for frictionally transmitting the rotation of the former to the latter;
    (d) a plurality of torsional or compression springs supported by the driven plate so as to be acted upon by the housing when a slip occurs in the frictionally transmitting means, each spring having opposite ends, an axial length, and opposite sides, each spring having its opposite ends disposed for engagement with opposed edges of the housing;
    (e) said driven plate having therein a plurality of rectangular openings, each of said plurality of springs being mounted in one of said plurality of rectangular openings, each rectangular opening having a length in a direction of rotation of the damper equal to said axial length; and
    (f) said housing, including said drive-plate, having a plurality of windows coinciding with said rectangular openings, said windows defining said opposed edges at opposite ends of each window, said opposed edges of each window being separated in the direction of rotation of the damper by a distance larger than said axial length of the respective spring whereby variable spacings are present between the ends of the springs and said opposed edges;
    whereby the resonance frequency of the damper is reduced to a frequency less than a normal frequency range of torque fluctuations to which the damper is to be subjected.

* * * * *